(12) United States Patent
Atalla

(10) Patent No.: US 11,419,454 B2
(45) Date of Patent: Aug. 23, 2022

(54) FRAMED COVER WITH ONE-WAY HINGES

(71) Applicant: Elie Atalla, Harrington Park, NJ (US)

(72) Inventor: Elie Atalla, Harrington Park, NJ (US)

(73) Assignee: Divergent Devices, Harrington Park, NJ (US)

( * ) Notice: Subject to any disclaimer, the term of this patent is extended or adjusted under 35 U.S.C. 154(b) by 330 days.

(21) Appl. No.: 16/586,585

(22) Filed: Sep. 27, 2019

(65) Prior Publication Data

US 2020/0022532 A1    Jan. 23, 2020

Related U.S. Application Data

(63) Continuation-in-part of application No. 15/964,028, filed on Apr. 26, 2018, now abandoned, which is a continuation of application No. 15/445,015, filed on Feb. 28, 2017, now abandoned.

(51) Int. Cl.
  *A47J 37/07* (2006.01)
  *A47C 31/11* (2006.01)
  *B60J 11/04* (2006.01)

(52) U.S. Cl.
  CPC ............ *A47J 37/0786* (2013.01); *A47C 31/11* (2013.01); *A47C 31/113* (2013.01); *B60J 11/04* (2013.01)

(58) Field of Classification Search
  CPC ...... A47J 37/0786; A47J 31/11; A47J 31/113; B60J 11/04; A47C 31/11; A47C 31/113
  See application file for complete search history.

(56) References Cited

U.S. PATENT DOCUMENTS

| | | | | | |
|---|---|---|---|---|---|
| 492,298 | A | * | 2/1893 | Johnson | ............... A47C 29/006 |
| 1,007,829 | A | * | 11/1911 | Westbrook | .............. E04H 15/38 135/133 |
| 5,655,559 | A | * | 8/1997 | Zembik | ................... E04H 15/38 135/132 |
| 5,842,495 | A | * | 12/1998 | Egnew | .................... E04H 15/38 135/133 |
| 6,470,901 | B1 | * | 10/2002 | Scherer | ................. E04H 15/322 135/121 |

* cited by examiner

*Primary Examiner* — Tri M Mai
(74) *Attorney, Agent, or Firm* — Thomas P. Heed; Heed Law Group

(57) ABSTRACT

A framed cover with one-way hinges is disclosed. A rigid tubular frame that is built into the cover's opening makes it possible to find the opening, lift the cover evenly, place the cover over the item, rotate the cover to the proper position and drop the cover in an even manner and without snagging. In addition, the tubular frame can be made to fold so that the cover can be stowed away for storage in a controlled manner, and by folding the tubular frame on a larger size cover it makes it easier for the user to control the covers weight because its center of gravity is held closer to the user's body until it is properly positioned and opened on top of the item to be covered.

25 Claims, 4 Drawing Sheets

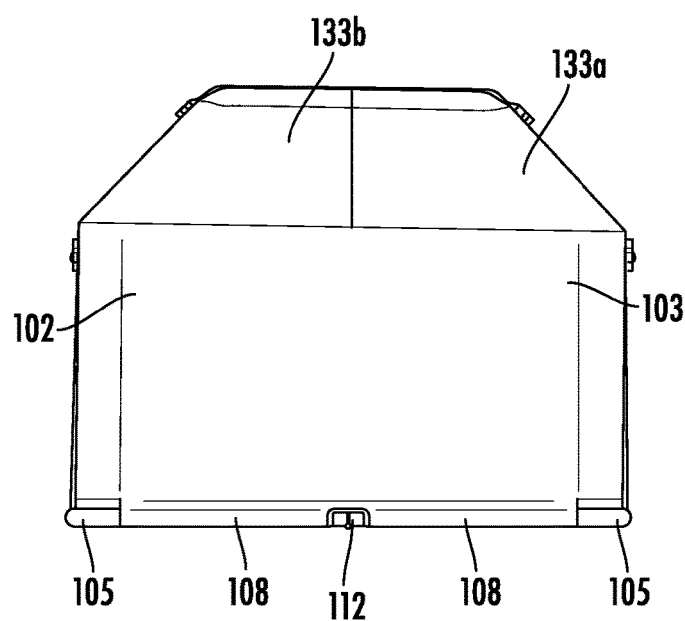
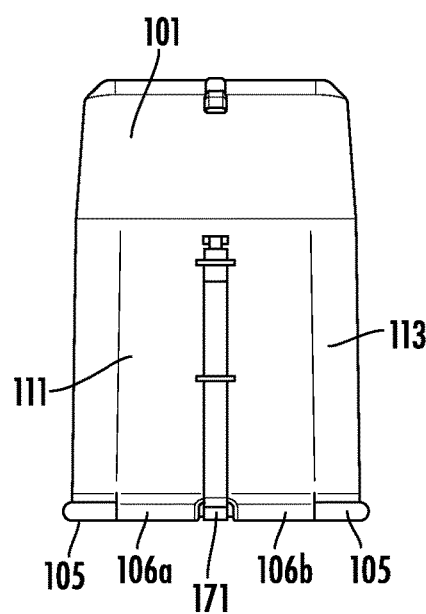
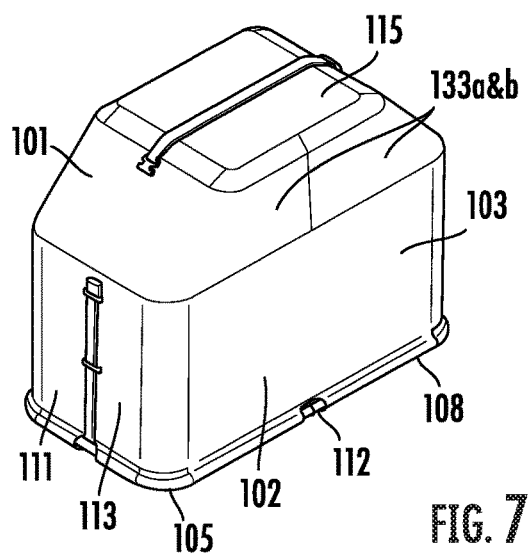

FRAMED COVER WITH ONE-WAY HINGES

CLAIM OF PRIORITY

This application claims priority to U.S. Non-Provisional Utility application Ser. No. 15/964,028 filed Apr. 26, 2018, which, in turn, claimed priority to U.S. Non-Provisional application Ser. No. 15/445,015, filed Feb. 28, 2017.

FIELD OF INVENTION

The present invention relates to the classification for Purses, Wallets, and Protective Covers and to one or more sub-classes related to Protective Covers Made from Flaccid Materials. In particular, the present invention relates to a protective cover made out of flaccid material, with a frame containing a one-way hinge.

BACKGROUND OF INVENTION

Placing and removing flexible covers over large items is difficult, cumbersome, and, potentially, time-consuming. Typically, a flexible cover will be constructed from a flaccid material such as cloth or plastic. The flexible cover will have an opening and must be dropped or lowered onto an item such that the flexible cover's opening properly accepts the item to be covered. In addition, if the flexible cover is fitted to a particular shape, such as an outdoor grill, table or chair, it becomes more difficult because the cover must be lowered onto the item and rotated such that the fitted spaces under the cover are matched to the intended parts of the item.

It is difficult to find the opening and proper position for a fully collapsed, flexible cover. Further, as the flaccid material of a flexible cover is pulled down from one side it may become too tight or out of position on the other side, so a back and forth, iterative process is required to fully pull down a cover. Other covers are completely flexible and must be opened partially, then pulled down over the item, then re-positioned and pulled down again and so on until all parts are under the cover as intended. The user also risks damaging the cover when force is applied to the cover during installation.

The covers in the prior art are problematic because they are not capable of being secured after installation. For example, excessive wind could displace the cover partially or completely.

The reason these devices do not work well is because there is no support for the flaccid material. It is by nature flaccid and will always fall where it is dropped.

Prior art covers are also problematic to remove. During removal the cover can get caught on any of the parts of the covered item that protrude or are in a fitted section of the cover. Thus, the cover is susceptible to damage and unwanted wear and tear.

Last, covers in the prior art cannot be folded into a compact configuration and are often difficult to neatly store for the same reason. Often times, the prior art covers are simply removed and placed near the item or object while in use, taking up much needed space and creating an eye sore.

Therefore, a need exists for a flexible cover that can be easily installed on items and objects, while being capable of being conveniently removed and stored.

SUMMARY OF THE INVENTION

This summary is intended to disclose the present invention, a framed cover with one-way hinge. The embodiment and description are used to illustrate the invention and its utility and are not intended to limit the invention or its use. The following presents a simplified summary of the primary embodiment of the invention to provide a basic understanding of the invention. Additional concepts that can be added or varied with the primary embodiment are also disclosed. Issues such as form-factor are addressed through the use of multiple examples. The present invention is novel with respect to the prior art, and can be distinguished from the prior art.

In general, the present invention, a framed cover with one-way hinges, provides a flexible cover with a framed opening. When not covering the desired item, the present invention has two states: open and closed. In its open state, the one-way hinges maintain the frame in a planar state, clearly defining an opening that can fit over the item to be covered. In its closed state, the one-way hinges fold the frame segments 180° so that the frame on either side of the one-ways hinges touch one another. In the closed configuration, there is no opening. Only the outsides of the flexible cover are exposed.

The flexible cover is fabricated from a flaccid material. The flexible cover has an identifiable contiguous outer surface and an identifiable contiguous inner surface. In practice, the flexible cover is typically comprised from a plurality of surfaces durably and permanently joined together, so that the flexible cover can possess a defined shape while being inexpensive. An opening in the flexible cover is defined where it transitions from an outer surface to an inner surface. The perimeter of the opening contains one or more flanges of flaccid material, which can be constructed into frame retainers.

The frame retainers are constructed by longitudinally joining the flange at the end of the flexible cover to either the inner or outer surface, while leaving the ends open. A void capable of accommodating the rigid tubular frame is thus created. In this way, the frame retainer can retain the frame in place, while allowing the user access to add or remove frame components. The longitudinally joined ends are permanently and durably attached to the flexible cover, typically by gluing, sewing, stapling, or pop-riveting.

The present invention contains a rigid tubular frame comprised of a plurality of connectors, an even plurality of one-way hinges, and a plurality of rigid tubular members. When assembled and in the open configuration, the frame is planar, defining a plane-shape opening for the item to be covered. Assembly begins by placing one rigid tubular member through a frame retainer, so that the two ends of the rigid tubular member extends out of either side of the frame retainer. The rigid tubular member is assembled by connecting the plurality of rigid tubular members, placed within the frame retainers, with the plurality of connectors and the even plurality of one-way hinges.

The rigid tubular members are hollow, typically with a circular cross-section. A connector joins the ends of two rigid tubular members. The connectors can be fabricated to be either internal or external to the end of the two rigid tubular connectors. The connectors can also be straight or angled. The internal connectors snuggly fit within the end of the rigid tubular members. The external connectors fit snuggly over the end of the rigid tubular members. The angled connectors join two rigid tubular members at a pre-defined angle. Typically, the pre-defined angle is 90°. An even plurality of one-way hinges is used. A one-way hinge is disposed opposite on the frame from another one-way hinge. Each one-way hinge has a built-in connector, so that it can join two rigid tubular members. By joining the plurality of rigid tubular members with the plurality of connectors and the even plurality of one-way hinges, an enclosed, plane-shaped frame, housed within the frame retainer, can be achieved.

When the assembled rigid tubular frame is inside the frame retainers, and the rigid tubular frame is in the open state, an opening in the flexible cover is apparent for the user. The user can lift the frame cover with one-way hinges evenly, place the framed cover with one-way hinges over the item, rotate the framed cover with one-way hinges to the proper position and drop the framed cover with one-way hinges in an even manner, without snagging. The rigid tubular frame enables an even control and positioning of the framed cover with one-way hinges above and around the item as it is being lowered thereon. Further, the weight of the rigid tubular frame helps in holding the framed cover with one-way hinges down and in proper position.

During removal, the rigid tubular frame embedded in the framed cover with one-way hinges allows a user to lift all sides of the framed cover with one-way hinges simultaneously thereby preventing snagging. When properly assembled, with each pair of one-way hinges disposed opposite one another on the rigid tubular frame, each pair of one-way hinges creates a folding joint. The folding joint allows the user to concentrate the mass of the framed cover with one-way hinges in a central position in front of their body to make it easier to support. The folding joint allows the user to fold the framed cover with one-way hinges, with only the external surface of the flaccid cover being exposed. When folded, the framed cover with one-way hinges is easy to stow for storage. By folding the rigid tubular frame on a larger size framed cover with one-way hinges about its folding joint, a user may more easily control the weight of the framed cover with one-way hinges because its mass centroid is centralized and relatively impervious to the effects of wind. One of the problems with covers is that the wind tends to make a challenging process of putting the cover on and taking the cover off. With other framed covers, the wind can fill the interior of the framed cover and push against the exterior of the framed cover. In the closed configuration, framed cover with one-way hinges prevents this.

The flexible cover is made of a suitable flaccid material for the item to be used. Depending on the application, the flaccid material can be cotton, synthetic fabric, canvas, or a thin-sheet flaccid polymer like low-density polyethylene or polypropylene. For example, a waterproof canvas for outdoor applications may be appropriate. A flexible cover template can be created easily for any item, defining a plurality of panels that, when attached together, forms a cover. The panels can conceivably be of any shape or size, provided that when attached together, they form a proper cover. A proper cover has a continuous exterior surface, a continuous interior surface, a single opening which fits over the item to be covered, and short-longitudinal flanges at the termination of the flexible cover about the opening. The panels of material are cut and durably and permanently attached together into a flexible cover. The panels may be durably and permanently attached together using familiar processes including, but not limited to stitching, gluing, cold-riveting, or heat-bonding, depending on the material and the needs. Any seams may be treated with a waterproofing agent such as neoprene, if appropriate. Frame retainers are created about the perimeter of the opening by joining the ends of the short-longitudinal flanges to either the inner or outer surface.

The rigid tubular members and connectors can be fabricated from metal or plastic. The choice of rigid tubular member material should be matched with the use and conditions it will be exposed to. For example, waterproof materials could be used for outdoor use. Heavier materials can be used when the risk is high of the wind inadvertently removing the frame cover with one-way hinges. Lighter material could be used for a smaller flexible cover, and stronger material could be used for larger, heavier flexible covers. One or more straps can be attached to the side or top of the framed cover with one-way hinges in order to make removal easier.

The advantages of the framed cover with one-way hinges lends itself to being placed by machines or robots, as well as normal users.

BRIEF DESCRIPTION OF THE DRAWINGS

The present invention is illustrated with 8 drawings on 4 sheets.

FIG. 5 is a front view of the framed cover with one-way hinges covering the item to be covered.

FIG. 6 is a side view of the framed cover with one-way hinges covering the item to be covered.

FIG. 7 is a perspective view of the framed cover with one-way hinges covering the item to be covered.

DETAILED DESCRIPTION OF THE DRAWINGS

The following descriptions are not meant to limit the invention, but rather to add to the summary of invention, and illustrate the present invention, a framed cover with one-way hinges. The present invention is illustrated with a variety of drawings showing the primary embodiment of the present invention, with examples presented of the various form-factors that the present invention can take.

Certain terminology is used in the following description for convenience only and is not limiting. The article "a" is intended to include one or more items, and where only one item is intended the term "one" or similar language is used. Additionally, to assist in the description of the present invention, words such as top, bottom, side, upper, lower, front, rear, inner, outer, right and left are used to describe the accompanying figures. The terminology includes the words above specifically mentioned, derivatives thereof, and words of similar import.

Referring to the figures, the present invention provides an easy to use framed cover with one-way hinges for convenient installation, removal and storage. The framed cover with one-way hinges protects an item or object from dust, rain, snow, etc. and can also be used to conceal the item or object. The primary embodiment of a framed cover with one-way hinges of the present invention is described in detail below.

Figure 1:
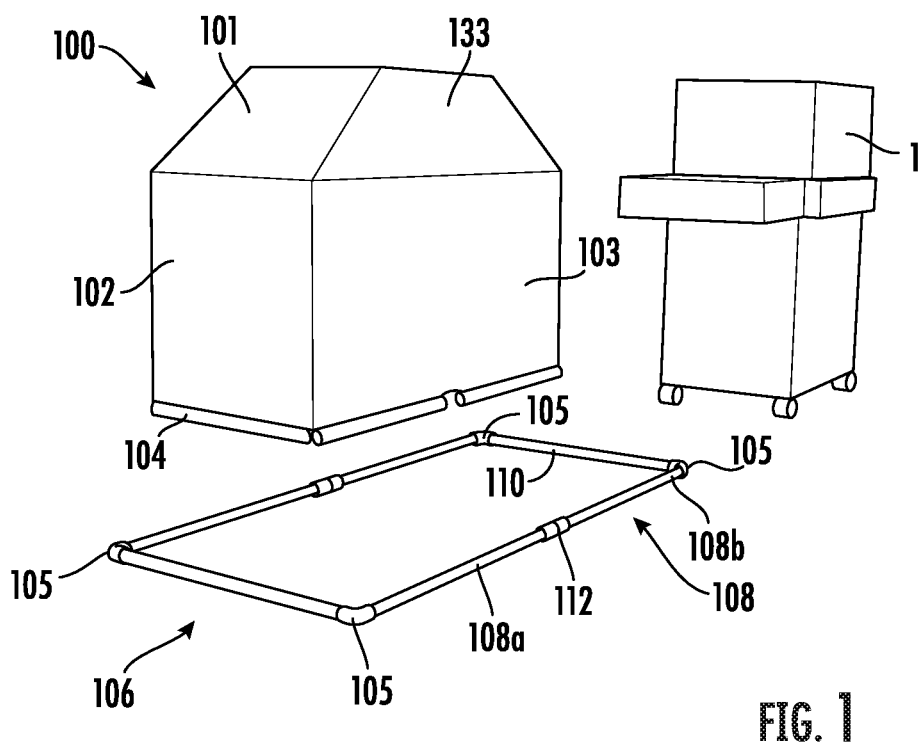
FIG. 1 is a perspective view of the present invention, a flaccid cover for a framed cover with one-way hinges and separately, a rigid tubular frame for a framed cover with one-way hinges, along with an item it is intended to cover.
Figure 2:
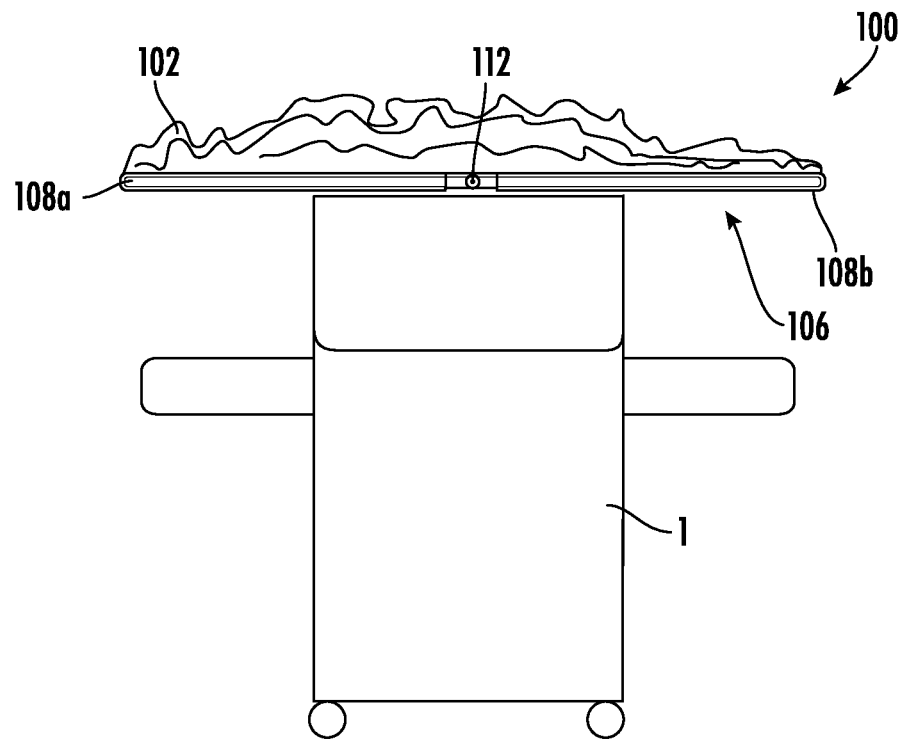
FIG. 2 is a front view of the framed cover with one-way hinges positioned over the item it is intended to cover.
Figure 3:
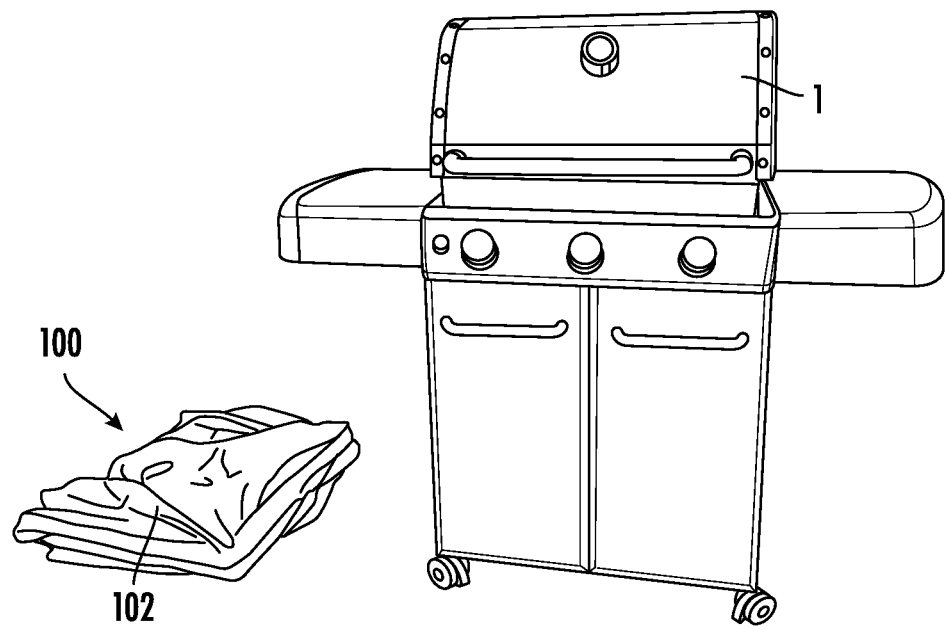
FIG. 3 is a front view of the item to be covered along side the frame cover with one-way hinges, folded.

Referring to FIG. 1, in general, the framed cover with one-way hinges of the present invention includes a 102 flexible cover operably coupled to a rigid tubular frame 106. The flexible cover 102 is comprised of a flaccid material, such as canvas, plastic or cloth, which is cut into a plurality of panels 103, 111, 113, 101, 115, 133 and assembled into the shape of the item 1 or object to be covered. The flexible cover 102 can be also be constructed of materials that are lightweight, mildew-resistant, UV-resistant and durable. The flexible cover 102 may have fitted areas that are intended to account for and help secure it around various parts of the item to be covered.

The flexible cover 102 is operably coupled to a rigid tubular frame 106 with a frame retainer 104, which can be stitched into or otherwise attached to or near the perimeter of the flexible cover's 102 opening (the opening is defined by the rigid tubular frame 106). The rigid tubular frame 106 encloses the opening. The rigid tubular frame 106 is constructed of a rigid but lightweight material capable of withstanding outdoor elements. For example, the rigid tubular frame could be high density, Schedule 80 PVC piping. Other durable plastics could be used as well. The rigid tubular frame 106 could also be constructed with lightweight, rust-resistant metals such as zinc or aluminum. If an application calls for a heavy rigid tubular frame 106, in order to keep the framed cover with one-way hinges in place, steel can be used for the rigid tubular frame. The rigid tubular frame 106 is comprised of a plurality of connectors, an even plurality of one-way hinges, and a plurality of rigid tubular members. The rigid tubular members of the rigid tubular frame are typically hollow, but may be solid. The rigid tubular members can be cylindrical or cubic rectangular, with a circle or square cross-section, respectively.

Referring to FIGS. 1-8, a framed cover with one-way hinges 100 of the present invention is shown. The framed cover with one-way hinges 100 is comprised of a flexible cover 102 and a rigid tubular frame 106. The framed cover with one-way hinges 100 has a form-factor, including a shape and size, that allows it to cover an outdoor grill 1. The framed cover with one-way hinges 100 includes a flexible cover 102 comprised of a plurality of panels 103, 111, 113, 101, 115, 133. The flexible cover 102 terminates at a plurality of frame retainers 104a, 104b. In this embodiment, the flexible cover 102 is fitted for an outdoor grill 1 with protruding shelves on both sides.

Referring to FIGS. 1 and 5-7, a flexible cover 102 such as this is cut from a flaccid material using a template, yielding panels 103, 111, 113, 101, 115, 133 that, when joined, will create a flexible cover 102 that fits over the grill 1. Thus, a fitted area is provided where less flaccid material is required in the upper portion of flexible cover 102. This is achieved by tapering panels 101, 133 and meeting with a smaller top panel 115. The flexible cover 102 has a continuous exterior surface made from the plurality of panels 103, 111, 113, 101, 115, 133. The flexible cover 102 has a continuous interior surface (not shown) obverse and opposed to the exterior surface 103, 111, 113, 101, 115, 133. A shape, such as a grill 1, can be fitted with a flexible cover 102 having various panel configurations (compare 133a, 133b, 101 in FIGS. 5-7 with 133, 101 in FIG. 1. In this way, the present invention 1 lends itself to a minimization of the flaccid material needed to construct the flexible cover 102.

Referring to FIG. 1, the framed cover with one-way hinges 100 has a rigid tubular frame 106. The rigid tubular frame 106 is comprised of a plurality of connectors 105, an even plurality of one-way hinges 112, and a plurality of rigid tubular members 106, 108, 110. In a rectangular frame, e.g., 106, the longer members 108 are referred to as longitudinal members 108 and the shorter members 106 are referred to as transverse embers 106. The even plurality of hinges 112 is placed disposed opposite one another, creating a folding joint. In practice, it is preferable to have a folding joint on the longitudinal members 108. Optionally, the folding joint 112 can be placed on the transverse members 106. Again, optionally, it is possible to place folding joints 112 on both the longitudinal members 108 and the transverse members 106.

The rigid tubular members 108, 108a, 108b can be either cylindrical or cubic rectangular and they can be either hollow or solid. In the illustrated embodiment, the rigid tubular members 108, 108a, 108b are hollow, typically with a circular cross-section. A connector 105 joins the ends of two rigid tubular members 108b, 110. The connectors 105 can be fabricated to be either internal or external to the end of the two rigid tubular members 108b, 110. The connectors 105 can also be straight or angled. The internal connectors snuggly fit within the end of the rigid tubular members 106, 108, 108a, 108b, 110. The external connectors 105 fit snuggly over the end of the rigid tubular members 106, 108, 108a, 108b, 110. The angled connectors join two rigid tubular members at a pre-defined angle. Typically, the pre-defined angle is 90°. In the illustrated embodiment, the connectors 105 are external to the ends of the plurality of rigid tubular members 106, 108, 108a, 108b, 110. In the illustrated embodiment, the connectors 105 are angled at 90°.

Figure 4:
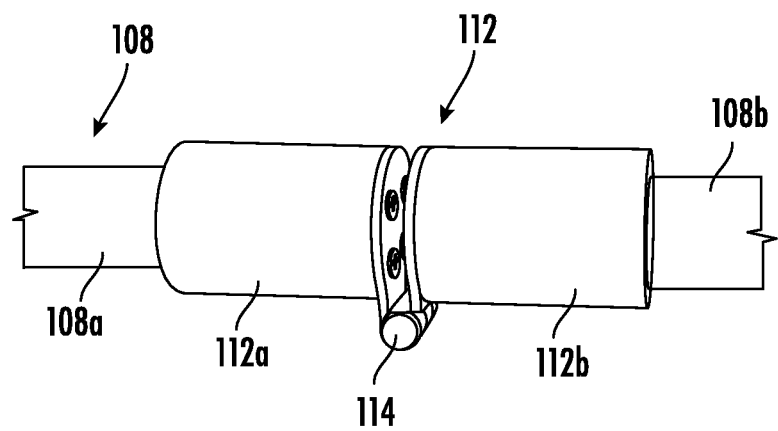
FIG. 4 is an isolation view of a one-way hinge.

Referring to FIGS. 1 and 4, an even plurality of one-way hinges 112 is used. A one-way hinge 112 is disposed opposite on the frame 106 from another one-way hinge 112. Each pair of opposed one-way hinges 112 creates a folding joint. Each one-way hinge 112 has a built-in connector, so that it can join two rigid tubular members 108a, 108b. The one-way hinge 112 is created by placing an axial hinge 114 between two connector elements called caps 112a, 112b. The caps 112a, 112b each retain a rigid tubular member 108a, 108b. The one-way hinge 112 allows the two rigid tubular members 108a, 108b to rotate 180° towards one another on the side on which the axial hinge 114 resides. A one-way hinge 112 should be placed on the longitudinal members 108a, 108b of a rectangular frame 106. A one-way hinge 112 may also be placed on the transverse members 106a, 106b of a rectangular frame 106. By having orthogonal folding joints created from pairs of one-way hinges 112, such as shown in FIGS. 5 and 6, the framed cover with one-way hinges 100 can be folded to a minimum footprint for easy storage and handling. The caps 112a, 112b and hinge 114 are preferably constructed of stainless steel to prevent corrosion but other materials could be used. Joining the one-way hinge 112 to two members 108a, 108b is accomplished with one or more of the following: adhesive, force-fit, threaded engagement, welding, or heat-staking. With this configuration, the framed cover with one-way hinges 100 will not collapse during installation and removal when a user applies an upward force to the rigid tubular frame 106 to lift the same.

Referring to FIGS. 1-2, 4, and 8, in its open state, the one-way hinges 112 maintain the frame 106 in a planar state, clearly defining an opening 106 that can fit over the item to be covered. In its closed state, the one-way hinges 112 fold the frame 108ab, 108b segments 180° so that the frame 108ab, 108b on either side of the one-ways 112 hinges touch one another. In the closed configuration, the opening 112 is eliminated. Only the outer surface of the flexible cover 102 are exposed. As shown in FIG. 6, one or more straps 171 can be placed on the sides or top of the framed cover with one-way hinges 100 to make removal easier.

By joining the plurality of rigid tubular members 106, 108, 108a, 108b, 110 with the plurality of connectors 105 and the even plurality of one-way hinges 112, an enclosed, plane-shaped frame 106, housed within the frame retainer 104, can be achieved, such as is shown in FIG. 1.

Figure 8:
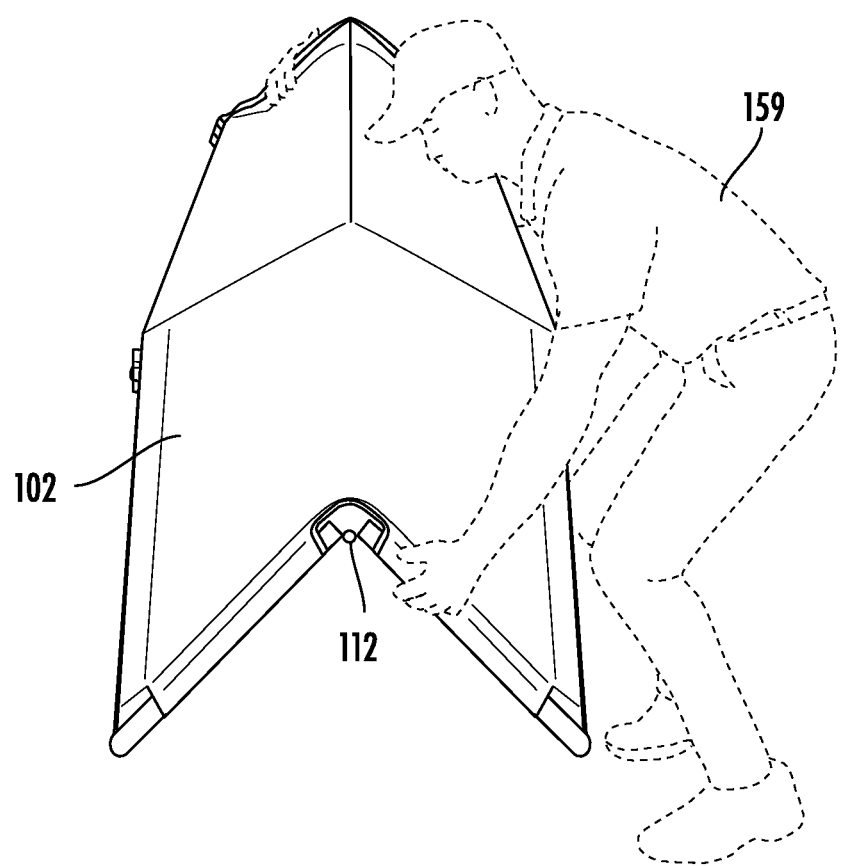
FIG. 8 is a side view of the framed cover with one-way hinges being folded by a user.

Referring to FIG. 8, a user 159 can collapse the framed cover with one-way hinges using the one-way hinges 112.

I claim:

1. A framed cover with one-way hinges comprising:
   a flexible cover constructed using a plurality of panels, fabricated from a flaccid material, having a continuous interior surface, a continuous exterior surface, at least one frame retainer, and at least one plane-shaped opening that will allow it to fit over an item to be covered;
   a rigid tubular frame having a plurality of connectors, an even plurality of one-way hinges, and a plurality of rigid tubular members, which fit together to make a continuous rigid tubular frame;
   wherein the at least one plane-shaped opening is defined by the rigid tubular frame;
   wherein the rigid tubular frame fits within the frame retainer, orienting the flexible cover so that the continuous exterior surface extends upward from the at least one plane-shaped opening;
   wherein the flexible cover is unsupported except for the rigid tubular frame that fits within the frame retainer about the periphery of the flexible cover; and
   wherein the even plurality of one-way hinges are oriented into the rigid tubular frame so that the rigid tubular frame is collapsible in the downward direction, but not the upward direction.

2. The framed cover with one-way hinges of claim 1, wherein each pair of one-way hinges are disposed opposite one another on the rigid tubular frame.

3. The framed cover with one-way hinges of claim 2, wherein each one-way hinge is comprised of a hinge connecting two caps.

4. The framed cover with one-way hinges of claim 3, wherein each cap of each one-way hinge can be durably attached to one rigid tubular member.

5. The framed cover with one-way hinges of claim 4, wherein the caps and hinges of the one-way hinges are fabricated from corrosion-resistant material.

6. The framed cover with one-way hinges of claim 5, wherein the corrosion-resistant material is stainless steel.

7. The framed cover with one-way hinges of claim 5, wherein each cap is attached to a rigid tubular member using at least one of gluing, force-fit, threading, welding, or heat-staking.

8. The framed cover with one-way hinges of claim 7, wherein the connectors attach with two rigid tubular members.

9. The framed cover with one-way hinges of claim 8, wherein the connectors fit over the rigid tubular members.

10. The framed cover with one-way hinges of claim 8, wherein the connectors connect two rigid tubular members at a 90° angle.

11. The framed cover with one-way hinges of claim 8, wherein the connectors are attached to the rigid tubular connectors using at least one of gluing, force-fit, threading, welding, and heat-staking.

12. The framed cover with one-way hinges of claim 8, wherein the frame retainer is fabricated by a longitudinal flange of material protruding about the opening of the flexible cover, and wherein the flange is durably connected to a surface of the flexible cover, making a void into which the rigid tubular frame can fit.

13. The framed cover with one-way hinges of claim 12, wherein the flange is durably connected to the surface using at least one of gluing, sewing, stapling, and pop-riveting.

14. The framed cover with one-way hinges of claim 1, wherein the plurality of members of the rigid tubular frame have a cross-section.

15. The framed cover with one-way hinges of claim 14, wherein the member cross-section is a circle.

16. The framed cover with one-way hinges of claim 1, wherein the plurality of members of the rigid tubular frame are hollow.

17. The framed cover with one-way hinges of claim 1, wherein the flexible cover is water-resistant.

18. The framed cover with one-way hinges of claim 1, wherein the flexible cover is water-proof.

19. The framed cover with one-way hinges of claim 1, wherein the flexible cover is dust-proof.

20. The framed cover with one-way hinges of claim 1, wherein the flaccid material is at least one of cotton, synthetic fabric, canvas, and a thin-sheet flaccid polymer.

21. The framed cover with one-way hinges of claim 20, wherein the plurality of panels is cut from the flaccid material.

22. The framed cover with one-way hinges of claim 21, wherein the plurality of panels are joined into a flexible cover using at least one of stitching, gluing, cold-riveting, and heat-bonding.

23. The framed cover with one-way hinges of claim 1, wherein the framed cover with one-way hinges can be folded using the one-way hinges, eliminating the opening and exposing only the exterior surface of the flexible cover.

24. The framed cover with one-way hinges of claim 1, wherein the framed cover with one-way hinges can be placed over an item to be covered, with the one-way hinges holding the rigid tubular frame open.

25. The framed cover with one-way hinges of claim 1, further comprising at least one strap, permanently attached to the flexible cover, to aid in the removal of the framed cover with one-way hinges.

* * * * *